(12) United States Patent
Jean (10) Patent No.: US 11,746,926 B2
(45) Date of Patent: Sep. 5, 2023

(54) METHOD FOR LAYING AND/OR RECOVERING A FLEXIBLE LINE IN A BODY OF WATER AND ASSOCIATED SYSTEM

(71) Applicant: TECHNIP N-POWER, Courbevoie (FR)

(72) Inventor: Sebastien Jean, Hautot sur Seine (FR)

(73) Assignee: TECHNIP N-POWER

( * ) Notice: Subject to any disclaimer, the term of this patent is extended or adjusted under 35 U.S.C. 154(b) by 0 days.

(21) Appl. No.: 17/419,362

(22) PCT Filed: Dec. 31, 2019

(86) PCT No.: PCT/EP2019/087188
§ 371 (c)(1),
(2) Date: Jun. 29, 2021

(87) PCT Pub. No.: WO2020/141172
PCT Pub. Date: Jul. 9, 2020

(65) Prior Publication Data
US 2022/0082182 A1 Mar. 17, 2022

(30) Foreign Application Priority Data

Dec. 31, 2018 (FR) .................................. 18 74403

(51) Int. Cl.
*F16L 1/23* (2006.01)
*F16L 1/15* (2006.01)
*F16L 1/19* (2006.01)

(52) U.S. Cl.
CPC .................. *F16L 1/15* (2013.01); *F16L 1/19* (2013.01); *F16L 1/23* (2013.01)

(58) Field of Classification Search
CPC ....... F16L 1/19; F16L 1/23; F16L 1/15; F16L 1/207; F16L 1/235; F16L 1/205; B63B 35/03
See application file for complete search history.

(56) References Cited

U.S. PATENT DOCUMENTS 4,150,911 A * 4/1979 Droste .................... B63B 35/03
226/25
9,631,742 B2 * 4/2017 Roodenburg ........... F16L 1/207
(Continued)

FOREIGN PATENT DOCUMENTS

FR       2 792 990 A1    11/2000
WO    WO 2007/108673 A1   9/2007
(Continued)

OTHER PUBLICATIONS

International Search Report dated Apr. 3, 2020 in corresponding PCT International Application No. PCT/EP2019/087188.
(Continued)

*Primary Examiner* — Carib A Oquendo
(74) *Attorney, Agent, or Firm* — OSTROLENK FABER LLP (57) ABSTRACT

A method including at least one phase of near-immobilization or immobilization of the line, including the following steps: activation of the motor of at least one upper tensioner and/or of at least one lower tensioner by a control unit, in order to apply to the movement member of the upper tensioner and/or of the lower tensioner, a holding torque to hold the line against its weight; at least occasional control by the control unit of at least one motor of an upper tensioner and/or of a lower tensioner for causing a movement member of the upper tensioner and/or lower tensioner to move or for changing the holding torque applied to the movement member of the upper tensioner and/or of the lower tensioner.

15 Claims, 6 Drawing Sheets

(56) References Cited

U.S. PATENT DOCUMENTS

| | | | | |
|---|---|---|---|---|
| 2008/0304912 A1* | 12/2008 | Roodenburg | ............ | F16L 1/19 |
| | | | | 405/168.3 |
| 2011/0123272 A1* | 5/2011 | Pose | ........................ | F16L 1/23 |
| | | | | 405/166 |
| 2014/0010595 A1* | 1/2014 | Maloberti | ................. | F16L 1/15 |
| | | | | 405/166 |
| 2014/0169885 A1* | 6/2014 | Green | ........................ | F16L 1/23 |
| | | | | 405/168.4 |
| 2015/0192222 A1* | 7/2015 | Preston | .................... | F16L 1/26 |
| | | | | 405/166 |

FOREIGN PATENT DOCUMENTS

| | | |
|---|---|---|
| WO | WO 2009/022189 A1 | 2/2009 |
| WO | WO 2012/126908 A2 | 9/2012 |

OTHER PUBLICATIONS

Written Opinion dated Apr. 3, 2020 in corresponding PCT International Application No. PCT/EP2019/087188.
Search Report dated Sep. 16, 2019 in corresponding French Patent Application No. 18 74403.

* cited by examiner

METHOD FOR LAYING AND/OR RECOVERING A FLEXIBLE LINE IN A BODY OF WATER AND ASSOCIATED SYSTEM

CROSS-REFERENCE TO RELATED APPLICATIONS

The present application is a 35 U.S.C. §§ 371 national phase conversion of PCT/EP2019/087188, filed Dec. 31, 2019, which claims priority to French Patent Application No. 18 74403, filed Dec. 31, 2018, the contents of which are incorporated herein by reference. The PCT International Application was published in the French language.

BACKGROUND OF THE INVENTION

The present invention relates to a method for laying and/or recovering a flexible line in a body of water, comprising:
providing a laying device comprising a pair of upper gripping mechanisms (or tensioners) and a pair of lower gripping mechanisms (or tensioners), each pair of gripping mechanisms (or tensioners) defining a line circulation passage in which the line is locally gripped; each gripping mechanism (or tensioner) comprising a line movement member and at least one movement member movement motor that can be activated to deliver a line movement torque;
a control unit for each motor,
the method comprising:
at least one laying and/or recovery phase in which the control unit activates the motor of at least one gripping mechanism (or tensioner) and delivers a movement torque generating a continuous movement of the line through each circulation passage;
at least one phase of near-immobilization or immobilization of the line.

The flexible line is in particular a flexible pipe as described in the normative documents published by the American Petroleum Institute (API), API 17J "Specification for Unbonded Flexible Pipe" 4th Edition May 2014, and API RP 17B "Recommended Practice for Flexible Pipe" 5th Edition May 2014. The flexible pipe is for example a riser and/or a flowline.

In one variant, the flexible pipe is a composite bundle, comprising at least one fluid transport tube and a set of electrical or optical cables suitable for transporting electrical or hydraulic power or information between the bottom and the surface of the body of water.

In another variant, the flexible line is a subsea umbilical described in API 17E, or an electrical power cable.

To deploy such flexible lines, it is known to unwind them from storage means present on a floating laying system, for example described in EP 2 005 050.

The storage means are in particular a rotating drum or basket.

The line is unwound from the storage means and then generally reassembled on a chute carried by the tower of the laying device.

The line is then engaged in gripping and moving assemblies comprising tracked tensioners. The line runs vertically or at an angle down the tower before plunging into the body of water.

The line is held in place by tensioning means that ensure its suspension in the body of water. In addition, the tensioning means support the mechanical tension coming from the weight of the unwound line and prevent the storage means from being subjected to this weight, while ensuring that the line does not undergo bending beyond its minimum bending radius (MBR) to avoid damage.

To lower the line into the water, a vertical well is usually provided through the ship's hull to form a passage for the line to descend. Such a well is called a "moon pool".

More generally, the tower of the laying device extends vertically or at an angle in the vicinity of this well to allow deployment of the line through the passage. Alternatively, the tower of the laying device is located at the rear of the hull.

In most cases, the installation device comprises at least a first group of upper tensioners and a second group of lower tensioners, from top to bottom on the tower.

Laying a flexible line in a body of water is not a completely continuous operation. Indeed, it is sometimes necessary to stop the installation of the line to carry out various operations.

This includes, for example, placing buoys around the line at regular intervals to give it a wave-shaped configuration.

Other operations include spot repairs on the line, or underwater operations related to the line, e.g. connections/disconnections, or underwater unmanned vehicle interventions.

Stopping the laying can also be the result of a pause, for example due to the weather and/or constraints imposed by nearby oil installations.

In order to temporarily stop the laying process, the tensioners are equipped with mechanical brake systems that block the shaft of at least one motor on command of the control unit. Then, when the installation can be restarted, the control unit deactivates the mechanical brakes and reactivates the tensioners.

Such a solution is not wholly satisfactory. While the load on the upper and lower tensioners is approximately equal during installation, this is not the case during the line's immobilization phase.

As soon as the mechanical brakes are activated, the load on the lower tensioners resulting from the weight of the line increases relative to the load on the upper tensioners. This causes an imbalance between the loads applied to the upper and lower tensioners. This imbalance can reach more than 10% in some cases.

To overcome this problem, and to prevent the lower tensioners from being overloaded, with possible consequences on the safety of the process, it is known to apply an increased safety coefficient with respect to the maximum voltage that can be nominally supported by the lower tensioners.

Such a solution is not satisfactory, since it is detrimental to the performance of the method and of the equipment, entailing for example unnecessarily oversizing the top tensioners or degrading their nominal capacity, reducing the weight of the line that can be laid or imposing stricter weather constraints.

One aim of the invention is therefore to obtain a laying method using upper tensioners and lower tensioners, the methods making it possible to carry out frequent immobilizations of the line during laying, while avoiding oversizing the equipment, or under-sizing the line to be laid.

SUMMARY OF THE INVENTION

To this end, the invention has as its object a method of the aforementioned type, characterized in that the or each phase of near-immobilization or immobilization of the line comprises the following steps:

activation of the motor of at least one upper gripping mechanism (or tensioner) and/or at least one lower gripping mechanism (or tensioner) by the control unit, in order to apply to the movement member of the upper gripping mechanism (or tensioner) and/or of the lower gripping mechanism (or tensioner) a torque for retaining the line against its weight by the pair of upper gripping mechanisms (or tensioners) and/or by the pair of lower gripping mechanisms (or tensioners), at least occasional control by the control unit of at least one motor of an upper gripping mechanism (or tensioner) and/or of a lower gripping mechanism (or tensioner) in order to produce a movement of a movement member of the upper gripping mechanism (or tensioner) and/or of the lower gripping mechanism (or tensioner) or to change the holding torque applied to the movement member of the upper gripping (or tensioner) mechanism and/or the lower gripping (or tensioner) mechanism without movement of the movement member of the upper gripping (or tensioner) mechanism and/or the lower gripping (or tensioner) mechanism.

The method according to the invention may comprise one or more of the following features, taken alone or in any combination that is technically possible:

it comprises at least one phase of near-immobilization of the line in which the control unit simultaneously drives at least one motor of an upper gripping mechanism (or tensioner) and at least one motor of a lower gripping mechanism (or tensioner) in order to generate a continuous movement of the movement members of the line causing a continuous movement of the line through each circulation passage at a speed of less than 1 m/hour;

in the line laying and/or recovery phase, the continuous movement of the line is greater than 1.5 m/hour;

the simultaneous control of at least one motor of an upper gripping mechanism (or tensioner) and at least one motor of a lower gripping mechanism (or tensioner) to generate a continuous movement of the movement members of the line comprises the measuring of information representative of a difference between the load applied to at least one upper gripping mechanism (or tensioner) and the load applied to at least one lower gripping mechanism (or tensioner) and selectively controlling at least one motor of an upper gripping mechanism (or tensioner) and at least one motor of a lower gripping mechanism (or tensioner) as a function of the measured load difference;

it comprises at least one phase of immobilization of the line, the phase of immobilization of the line comprising a succession of intervals of keeping the line immobile, in which the motors of at least one upper gripping mechanism (or tensioner) and of at least one lower gripping mechanism (or tensioner) apply the holding torque to the line without movement of a movement member, and load regulation intervals in which a motor of an upper gripping mechanism (or tensioner) or of an upper gripping (or tensioning) mechanism is active in order to generate a movement of a movement member of the lower gripping mechanism (or tensioner) and/or the upper gripping mechanism (or tensioner) or a change in the holding torque applied to the movement member of the upper mechanism (or tensioner) and/or the lower gripping mechanism (or tensioner) without movement of the movement member of the upper gripping mechanism (or tensioner) and/or the lower gripping mechanism (or tensioner).

during each regulation interval, the motor of at least one lower gripping mechanism (or tensioner) is activated to generate a movement of a movement member of the lower gripping mechanism (or tensioner) or a change in the holding torque applied to the movement member of the lower gripping mechanism (or tensioner) without movement of the lower gripping mechanism (or tensioner), the motor of each upper gripping mechanism (or tensioner) being activated to apply to the movement member of the upper gripping mechanism (or tensioner) a torque retaining the line against its weight without moving the movement member of the upper gripping mechanism (or tensioner);

during the immobilization phase, a mechanical brake is permanently applied to at least one upper gripping mechanism (or tensioner) to immobilize the upper gripping mechanism (or tensioner), and during each regulation interval, the motor of at least one lower gripping mechanism (or tensioner) is activated to generate a movement of a movement member of the lower gripping mechanism (or tensioner) or a change in the torque applied to the movement member of the lower gripping mechanism (or tensioner) without moving the lower gripping mechanism (or tensioner);

during the immobilization phase, a mechanical brake is permanently applied to at least one lower gripping mechanism (or tensioner) to immobilize the lower gripping mechanism (or tensioner), and during each regulation interval, the motor of at least one upper gripping mechanism (or tensioner) is activated to generate a movement of a movement member of the upper gripping mechanism (or tensioner) or a change in the torque applied to the movement member of the upper gripping mechanism (or tensioner) without moving the upper gripping mechanism (or tensioner);

it comprises the measuring of information representative of a difference between the load applied to at least one upper gripping mechanism (or tensioner) and the load applied to at least one lower gripping mechanism (or tensioner), the movement of a movement member of the lower gripping mechanism (or tensioner) and/or of the upper gripping mechanism (or tensioner) by the motor during each regulation interval or the torque applied to the movement member of the lower gripping mechanism (or tensioner) and/or of the upper gripping mechanism (or tensioner) by the motor during each regulation interval being controlled as a function of the representative information;

the movement of a movement member of the lower gripping mechanism (or tensioner) and/or of the upper gripping mechanism (or tensioner) by the motor during each regulation interval or the change in the holding torque applied to the movement member of the upper gripping mechanism (or tensioner) and/or of the lower gripping mechanism (or tensioner) is carried out when the load difference exceeds a first predefined threshold and is stopped when the load difference falls below a second predefined threshold, advantageously lower than or equal to the first predefined threshold.

The invention also relates to a system for laying and/or recovering a flexible line in a body of water, comprising:

a laying device comprising a pair of upper gripping mechanisms (or tensioners) and a pair of lower gripping mechanisms (or tensioners), each pair of gripping mechanisms (or tensioners) defining a line circulation passage into which the line is locally clamped;

each gripping mechanism (or tensioner) comprising a member for moving the line and at least one motor for moving the movement member, which can be activated to deliver a movement torque for the line;

a control unit for each motor, able to carry out:

at least one laying and/or recovery phase in which the control unit activates the motor of at least one gripping mechanism (or tensioner) and delivers a movement torque generating a continuous movement of the line through each circulation passage;

at least one phase of near-immobilization or immobilization of the line;

characterized in that, during the or each phase of near-immobilization or immobilization of the line, the control unit is suitable to:

activate the motor of at least one upper gripping mechanism (or tensioner) and/or at least one lower gripping mechanism (or tensioner), in order to apply to the movement member of the upper gripping mechanism (or tensioner) and/or of the lower gripping mechanism (or tensioner) a torque for retaining the line against its weight by the pair of upper gripping mechanisms (or tensioners) and/or by the pair of lower gripping mechanisms (or tensioners), at least occasionally control at least one motor of an upper gripping mechanism (or tensioner) and/or of a lower gripping mechanism (or tensioner) in order to produce a movement of a movement member of the upper gripping mechanism (or tensioner) and/or of the lower gripping mechanism (or tensioner) or to change the holding torque applied to the movement member of the upper gripping (or tensioner) mechanism and/or the lower gripping (or tensioner) mechanism without movement of the movement member of the upper gripping (or tensioner) mechanism and/or the lower gripping (or tensioner) mechanism.

The system according to the invention may comprise one or more of the following features, taken alone or in any combination that is technically possible:

the control unit is able to carry out a phase of near-immobilization of the line in which the control unit simultaneously drives at least one motor of an upper gripping mechanism (or tensioner) and at least one motor of a lower gripping mechanism (or tensioner) in order to generate a continuous movement of the movement members of the line causing a continuous movement of the line through each circulation passage at a speed of less than 1 m/hour;

the control unit is able to carry out at least one phase of immobilization of the line, the phase of immobilization of the line comprising a succession of intervals of keeping the line immobile, in which the motors of at least one upper gripping mechanism (or tensioner) and of at least one lower gripping mechanism (or tensioner) apply the holding torque to the line without movement of a retaining member, and load regulation intervals in which a motor of an upper gripping mechanism (or tensioner) or of an upper gripping (or tensioning) mechanism is active in order to generate a movement of a movement member of the lower gripping mechanism (or tensioner) and/or the upper gripping mechanism (or tensioner) or a change in the holding torque applied to the movement member of the upper mechanism (or tensioner) and/or the lower gripping mechanism (or tensioner) without movement of the movement member of the upper gripping mechanism (or tensioner) and/or the lower gripping mechanism (or tensioner).

during each regulation interval, the control unit is able to activate the motor of at least one lower gripping mechanism (or tensioner) to generate a movement of a movement member of the lower gripping mechanism (or tensioner) or a change in the holding torque applied to the movement member of the lower gripping mechanism (or tensioner) without movement of the lower gripping mechanism (or tensioner), the motor of each upper gripping mechanism (or tensioner) being activated to apply to the movement member of the upper gripping mechanism (or tensioner) a torque retaining the line against its weight without moving the movement member of the upper gripping mechanism (or tensioner);

the laying device comprises at least one mechanical brake able to mechanically immobilize at least one motor of an upper gripping mechanism (or tensioner) and which can be activated by the control unit, the control unit being suitable, during each immobilization phase, for permanently applying the mechanical brake to at least one upper gripping mechanism (or tensioner) in order to immobilize the upper gripping mechanism (or tensioner), and during each regulation interval, to activate the motor of at least one lower gripping mechanism (or tensioner) in order to generate a movement of a movement member of the lower gripping mechanism (or tensioner) or to modify the holding torque applied to the movement member of the lower gripping mechanism (or tensioner) without moving the lower gripping mechanism (or tensioner);

the laying device comprises at least one mechanical brake able to mechanically immobilize at least one motor of an upper gripping mechanism (or tensioner), which can be activated by the control unit, the control unit being suitable, during each immobilization phase, for permanently applying the mechanical brake to at least one lower gripping mechanism (or tensioner) in order to immobilize the lower gripping mechanism (or tensioner), and during each regulation interval, to activate the motor of at least one upper gripping mechanism (or tensioner) in order to generate a movement of a movement member of the upper gripping mechanism (or tensioner) or to modify the holding torque applied to the movement member of the upper gripping mechanism (or tensioner) without moving the upper gripping mechanism (or tensioner);

it comprises at least one sensor for the measuring of information representative of a difference between the load applied to at least one upper gripping mechanism (or tensioner) and the load applied to at least one lower gripping mechanism (or tensioner), the control unit being suitable for controlling the movement motor of a movement member of the lower gripping mechanism (or tensioner) and/or of the upper gripping mechanism (or tensioner) during each regulation interval as a function of the representative information.

BRIEF DESCRIPTION OF THE DRAWINGS

The invention will be better understood upon reading the following description, given only as an example, and with reference to the attached drawings, in which.

DETAILED DESCRIPTION OF EMBODIMENTS OF THE INVENTION

Figure 1:
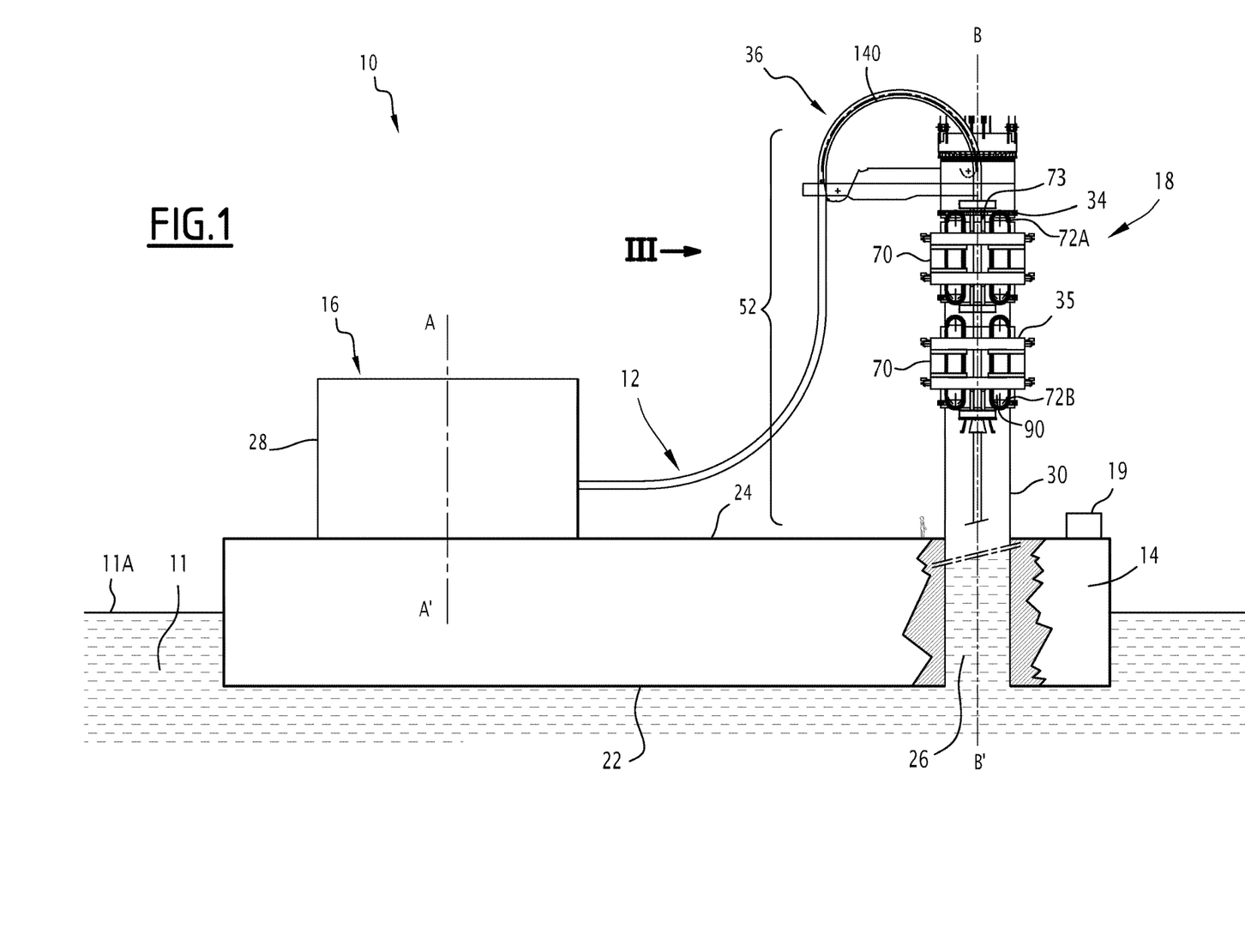
FIG. 1 is a schematic view of a first laying and/or recovery system according to the invention.
Figure 2:
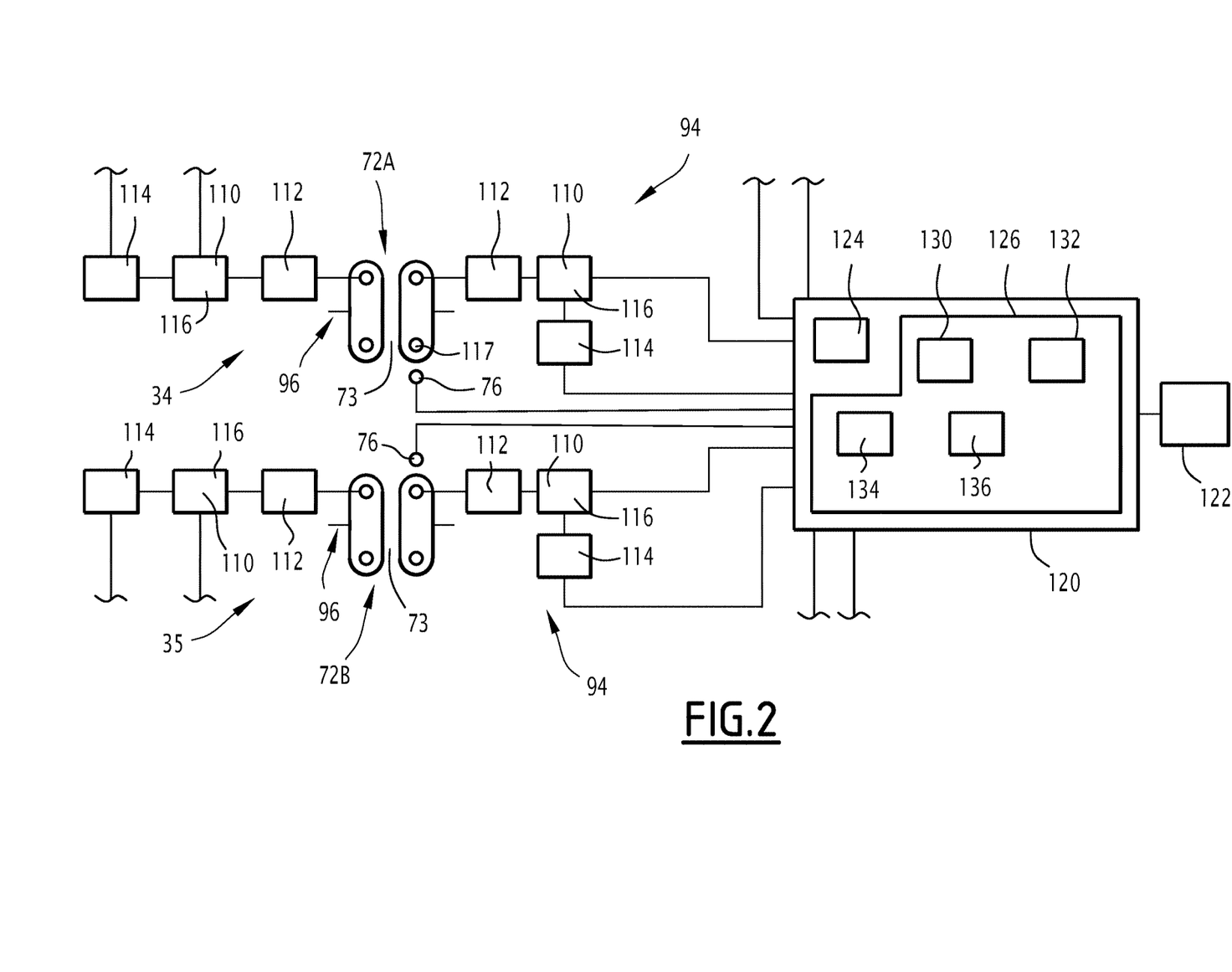
FIG. 2 is a block diagram illustrating the laying device and the control unit of the device in the laying and/or recovery system according to the invention.
Figure 3:
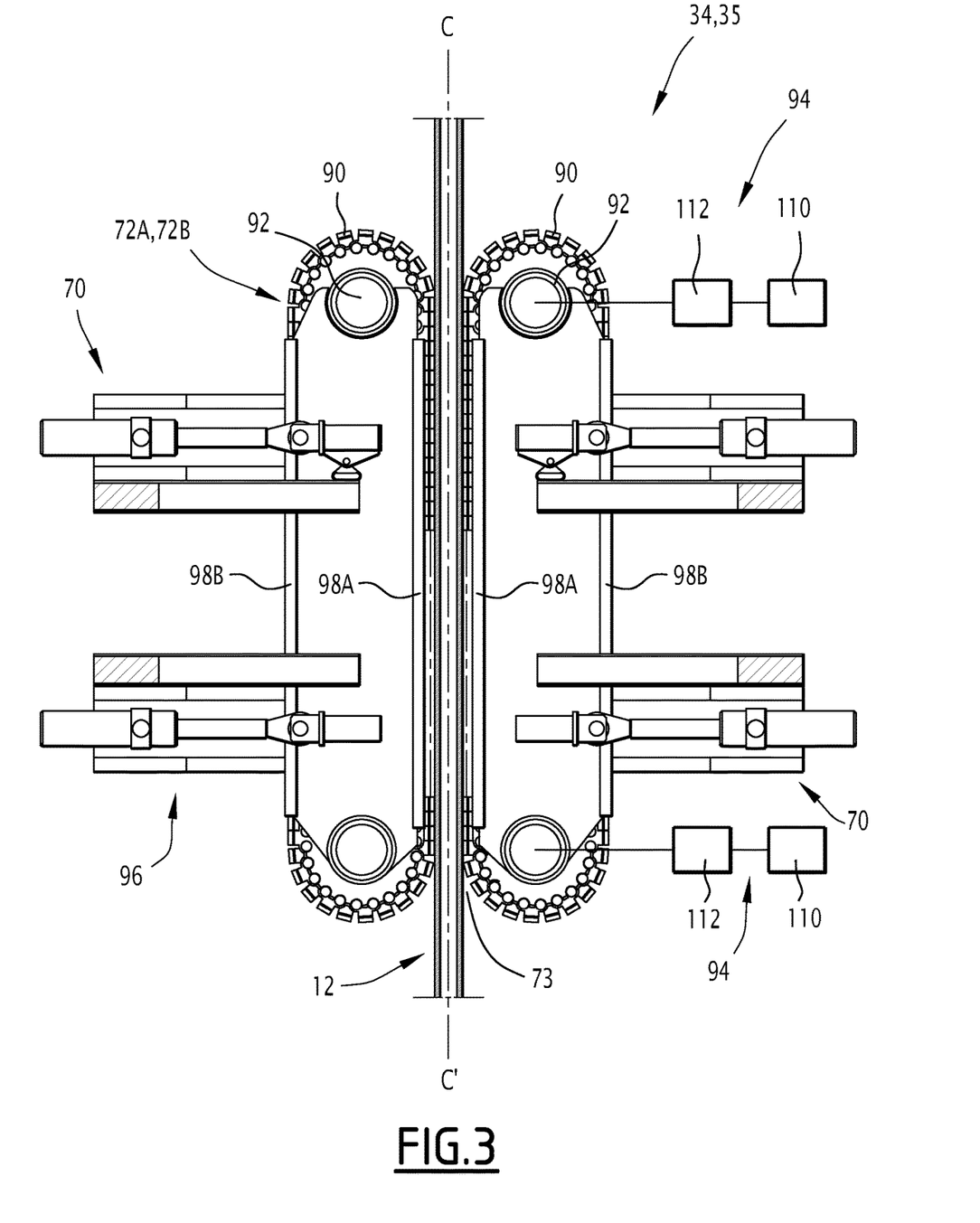
FIG. 3 is a schematic view of a laying device tensioner according to the invention.

A first system 10 for laying and/or recovering a flexible line 12 is shown in FIGS. 1 to 3.

In this example, the system 10 floats on a body of water 11 (visible in FIG. 1) which is for example a sea, ocean or lake. The depth of the body of water 11 between the surface 11A and the bottom is greater than 5 meters, and is in particular between 100 meters and 4,000 meters.

The laying system 10 is intended for laying and/or recovering a flexible line 12 which is advantageously a flexible pipe.

Flexible pipe includes pipe as described in the normative documents published by the American Petroleum Institute (API), API 17J, and API RP17B. The pipe is alternatively an umbilical as described in the normative documents published by the American Petroleum Institute (API), AP117E or an unwound rigid pipe.

This definition includes both unbonded and bonded flexible pipes.

More generally, in one variant, the flexible line 12 is a composite bundle, comprising at least one fluid transport tube and a set of electrical or optical cables suitable for transporting electrical or hydraulic power or information between the bottom and surface of the body of water.

In another variant, the flexible line is a subsea umbilical described in API 17E, or an electrical power cable.

The line 12 may carry equipment, such as buoys, connectors, or bottom equipment that has a greater transverse extent than its average transverse extent.

With reference to FIG. 1, the laying and/or recovery system 10 comprises a hull 14 floating on the body of water 11, and a line 12 storage assembly 16 on the hull 14.

It comprises a laying and/or recovery device 18 and a control unit 19, both mounted on the shell 14.

The hull 14 is, for example, the hull of a vessel comprising propulsion means. In one variant, the hull 14 is formed by a platform floating on the body of water 11, a barge, or a semi-submersible barge.

The hull 14 extends between a lower surface 22 submerged in the body of water 11 and an upper deck 24, from which the laying and/or recovery device 18 projects.

Advantageously, the deck 24 is located above the surface 11A of the body of water 11. In this example, the shell 14 defines internally, between the lower surface 22 and the upper surface 24, a central through-well 26, visible in FIG. 1.

The central shaft 26 extends vertically. It opens upwardly onto the deck 24 and it opens downwardly into the body of water 11 through the lower surface 22.

When the line 12 is a flexible pipe, the storage assembly 16 is formed by a rotatable pipe storage member 28 in a wound configuration. The rotating member 28 is, for example, a drum with a horizontal axis of rotation or a basket with a vertical axis of rotation.

The storage assembly 16 is arranged on the deck 24 or in the hull 14.

The rotation of the storage member 28 in a first direction about its axis A-A' allows an increasing length of line 12 to be unwound to the laying device 18, while rotation in a second direction opposite the first direction allows an increasing length of pipe to be wound onto the storage member 28.

According to the invention, the laying device 18 comprises a tower 30 with a vertical axis B-B', defining a tower axis, at least one upper assembly 34 for gripping and moving the line 12, and at least one lower assembly 35 for gripping and moving the line 12, the assemblies 34, 35 being carried by the tower 30.

The laying device 18 further comprises an assembly 36 for guiding the movement of the line 12 between the storage assembly 16 and the gripping and moving assemblies 34, 35.

Each assembly 34, 35 comprises a support frame 70 and at least two gripping mechanisms. The gripping mechanisms here are tracked tensioners 72A, 72B carried by the chassis 70. In the following, the term "tensioner" is to be understood as synonymous with "gripping mechanism".

Each assembly 34, 35 further includes a sensor 76 for the measuring of information representative of the load applied by the line 12 onto the tensioner 72A, 72B (visible in FIG. 2).

Each frame 70 is adapted to be moved between an open configuration for placing the line 12 in the frame and a closed configuration for use.

In the closed configuration, with reference to FIG. 3, each frame 70 defines a central passage 73 extending vertically along an axis C-C' defining a laying axis of the line 12. This laying axis C-C' is substantially parallel to the axis B-B' of the tower 30, i.e. completely parallel or inclined at an angle of less than, for example, 10° to the axis B-B'.

With reference to FIGS. 2 and 3, each frame 70 advantageously carries two tensioners 72A, 72B arranged substantially parallel to each other Each tensioner 72A, 72B projects into the passage 73 towards the C-C' axis.

The tensioner 72A, 72B comprises a movement member 90, formed by a guide track for gripping and moving the line 12, two sprockets 92, on which the movement member 90 is wound, a device 94 for driving the movement member 90 along the axis B-B', and a mechanism 96 for radially moving each movement member 90 towards the axis B-B'.

The movement member 90 is substantially in the form of an endless belt wound on two sprockets 92. It thus has a longitudinal portion 98A for guiding the pipe and a longitudinal return portion 98B, intended to extend parallel to the axis C-C' of laying.

The guide portion 98A is adapted to contact the outer peripheral surface of the line 12 along a generatrix. In the closed configuration, the opposite guide sections 98A of two facing tensioners 72 face each other and are adapted to respectively grip two opposite angular sections of the line 12 with respect to the axis C-C'.

The sprockets 92 are rotatable about an axis perpendicular to the axis C-C'. They are rotated about their axis by the device 94 to cause the parts 98A, 98B to move parallel to the axis C-C'.

With reference to FIG. 2, each drive device 94 comprises a motor 110, controllable by the control unit 19, advantageously a geared motor 112, connecting the motor 110 to at least one sprocket 92 and a mechanical brake 114 for locking the motor 110.

Advantageously, the drive device 94 comprises a sensor 116 for measuring the torque applied by each motor 110, and/or a sensor 117 for measuring the speed of movement of the line 12.

The motor 110 is for example a hydraulic motor or an electric motor. It is able to generate a variable torque depending on the desired configuration. The variable torque is selected from a torque for retaining the line 12 in an immobile or near-immobile configuration of the line 12, and a torque for moving the line 12 through the central passage 73 in a moving configuration of the line 12.

The mechanical brake 114 is also controllable by the control unit 19 between a disengaged position, in which the motor 110 is free to rotate the sprockets 92, and an engaged position in which it is capable of immobilizing the motor 110 and/or each sprocket 92 to statically retain the line 12, even in the absence of torque applied by the motor 110.

The radial movement mechanism 96 comprises, for example, at least one actuator adapted to radially move each movement member 90 towards the laying axis C-C', in order to apply a determined force on the outer peripheral surface of the line 12.

The control unit 19 is schematically depicted in FIGS. 1 and 2. For example, it includes a computer 120 and a human-machine interface 122.

The computer 120 comprises a processor 124 and a memory 126 suitable for containing functional software modules to be run by the computer 124. In one variant, the functional modules are implemented at least partially as programmable logic components or as dedicated integrated circuits.

In this example, the memory 126 contains a module 130 for selectively activating each motor 110, a module 132 for regulating each the speed or torque of each motor 110, connected to each sensor 116, 117, and advantageously, a module 134 for activating the mechanical brake 114.

According to the invention, it contains a module 136 for controlling the modules 130, 132, 134 between an idle configuration, a configuration for laying and/or recovering the line 12, a configuration for near-immobilization of the line 12 and a configuration for immobilization of the line 12.

In the idle configuration, the activation module 130 deactivates each motor 110 and the activation module 134 activates at least one mechanical brake 114.

In the laying and/or recovery configuration, the activation module 134 deactivates each mechanical brake 114. The activation module 130 activates each motor 110 and the regulation module 132 controls the torque and/or speed of each motor 110 on the basis of the information received from at least one sensor 116, 117 in order to achieve a laying and/or recovery speed greater than 2 m/hour, in particular between 2 m/hour and 2,000 m/hour.

In the near-immobilization configuration, the activation module 134 deactivates each mechanical brake 114 and activates each motor 110.

The regulation module 132 simultaneously controls at least one motor 110 of an upper tensioner 72A and at least one motor 110 of a lower tensioner 72B to generate a continuous movement of the movement members 90 of the line 12, causing a continuous movement of the line 12 through each circulation passage 73, at a speed of less than 1 m/hour.

In the immobilization configuration, the control module 136 controls the modules 132 and 134 to perform a succession of maintaining-immobile intervals of the line 12, in which the motors 110 of at least one upper tensioner 72A and of at least one lower tensioner 72B apply a holding torque to the line 12 without moving a retaining member 90, and load regulation intervals, in which a motor 110 of an upper tensioner 72A or of an upper tensioner 72B is active to generate a limited movement of a retaining member 90 of a lower tensioner 72A and/or an upper tensioner 72B or a change in the holding torque applied to a movement member 90 of a lower tensioner 72A and/or of an upper tensioner 72B.

Preferably, the control module 136 regularly measures information representative of a difference between the load applied to at least one upper tensioner 72A and the load applied to at least one lower tensioner 72B using the sensors 76, and moves a movement member 90 of the lower tensioner 72B and/or the upper tensioner 72A by the motor 110, or changes the torque applied to a movement member 90 of the lower tensioner 72B and/or the upper tensioner 72A by the motor 110 according to the measured representative information.

In particular, if the aforementioned load difference reaches a predetermined threshold, the control module 136 activates the motor 110 of a lower tensioner 72B in order to move a movement member 90 of the lower tensioner 72B or to change the holding torque applied to the movement member 90 of the lower tensioner 72B until the measured load difference is less than or equal to the predetermined threshold.

The human-machine interface 122 comprises, for example, a control member, in particular a joystick and/or a touch screen, and a display to allow the control unit 19 to be switched between the idle configuration, the laying and/or recovery configuration, the near-immobilization configuration and the immobilization configuration of the line 12. It is adapted to allow the user to select a laying and/or recovery speed of the line 12 in the laying and/or recovery configuration.

With reference to FIG. 1, the guide assembly 34 includes at least one curved guide chute 140 or wheel disposed above the tower 30 for redirecting the flexible line 12 taken from the storage assembly 16 in the axis of the tower 30.

The chute 140 is substantially U-shaped and faces downward, defining a suitable bending radius for the line 12. This bending radius is greater than the minimum bending radius (MBR) of the line 12.

A method for laying the line 12, implemented using the system 10, will now be described.

Initially, the flexible line 12 is stored in the storage assembly 16 by being wound on the rotating member 28.

The line 12 thus maintains an adequate radius of curvature greater than its MBR.

The system 10 is then moved across the body of water 11 to a laying region where the line 12 is to be deployed.

The respective frames 70 of the gripping and moving assemblies 34, 35 are at least partially open.

One end of the line 12 is then brought into contact with the chute 140 by engaging it thereon.

Then, a line section 12 is successively deployed over the chute 140 and then lowered through each frame 70 to extend vertically along the C-C' axis.

Next, the 70 frames are moved to their closed position. The mechanisms 96 for radially moving the movement members 90 are then activated to apply each longitudinal guide portion 98A against the outer peripheral surface of the line 12 along a generatrix thereof.

The radial movement mechanisms 96 are further controlled to apply a predetermined pressure to the line 12.

Figure 4:
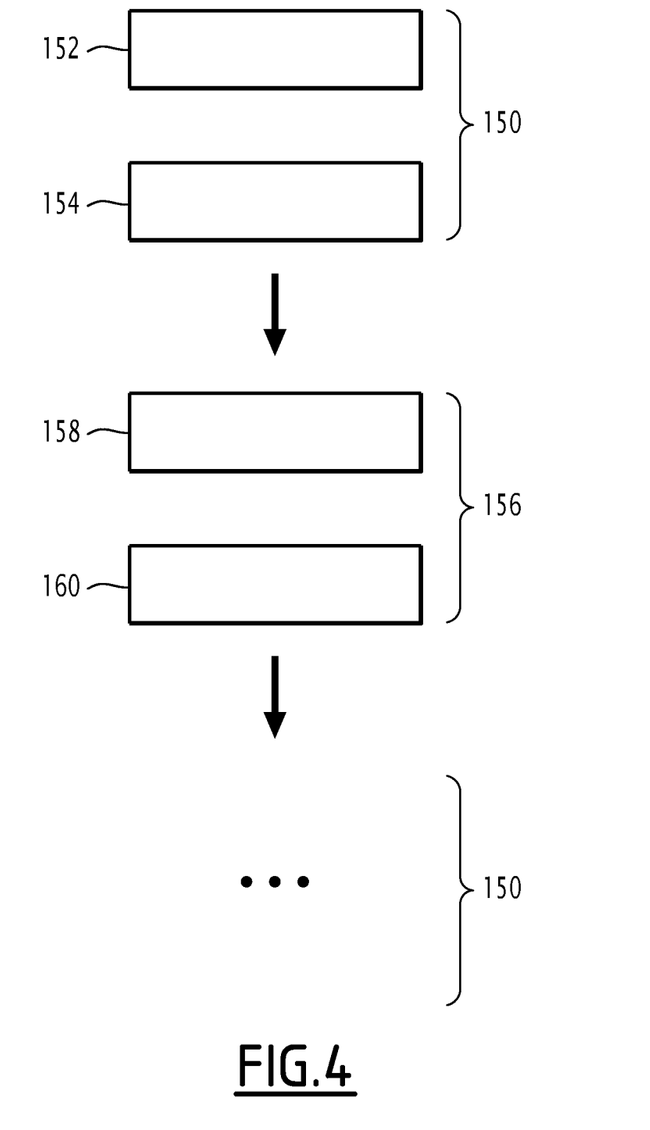
FIG. 4 is a flow chart illustrating the successive steps of a laying and/or recovery method according to the invention.

With reference to FIG. 4, a laying phase 150 is then performed. In this step 150, the control unit 19 switches to its laying configuration. It activates the motors 110 in step 152, and drives the motors in step 154 to develop a movement torque for the movement member 90. This results in a continuous movement of line 12 through the circulation passages 73, regulated at a speed of travel greater than 2 m/hour, in particular between 2 m/hour and 2,000 m/hour.

The device 94 for rotating the sprockets 92 is activated. The movement members 90 are driven to move, so that each longitudinal portion 98A moves up and down driving the line 12. The line 12 is thus driven in translation along the laying axis C-C' by the movement members 90 of the tensioners 72A, 72B facing each assembly 34, 35.

An increasing length of line 12 can thus be deployed, with controlled tension, through the gripping and guiding assemblies 34A, 34B.

In a first method according to the invention, illustrated by FIG. 4, when the laying has to be interrupted, for example for the installation of a buoy, for a line repair, to perform underwater activities such as a connection, or for a stop, a near-immobilization phase 156 is then implemented.

In this near-immobilization phase 156, the control unit 19 switches to the near-immobilization configuration in step 158.

It simultaneously activates and controls at least one motor 110 of an upper tensioner 72A and at least one motor 110 of a lower tensioner 72B (step 160), to generate a continuous movement of the movement members 90, causing a continuous movement of the line 12 through each circulation passage 73, at a speed of less than 1 m/hour, in particular less than 0.25 m/hour.

The simultaneous control 160 advantageously comprises the measuring of information representative of a difference between the load applied by the line 12 to at least one upper tensioner 72A and the load applied to the line 12 by at least one lower tensioner 72B using the sensors 76.

Simultaneous control 160 includes selectively controlling at least one motor 110 of an upper tensioner 72A and at least one motor 110 of a lower tensioner 72B as a function of the measured load difference, to keep the load difference below a determined threshold.

During the near-immobilization phase, the movement of the line 12 is imperceptible to the operators working around the line 12. The operations on the line can therefore be carried out normally.

However, even if the line 12 is almost at a standstill, the load difference between the upper tensioners 72A and the lower tensioners 72B remains very small, due to the regulation, ensuring a load balance between the tensioners 72.

Figure 5:
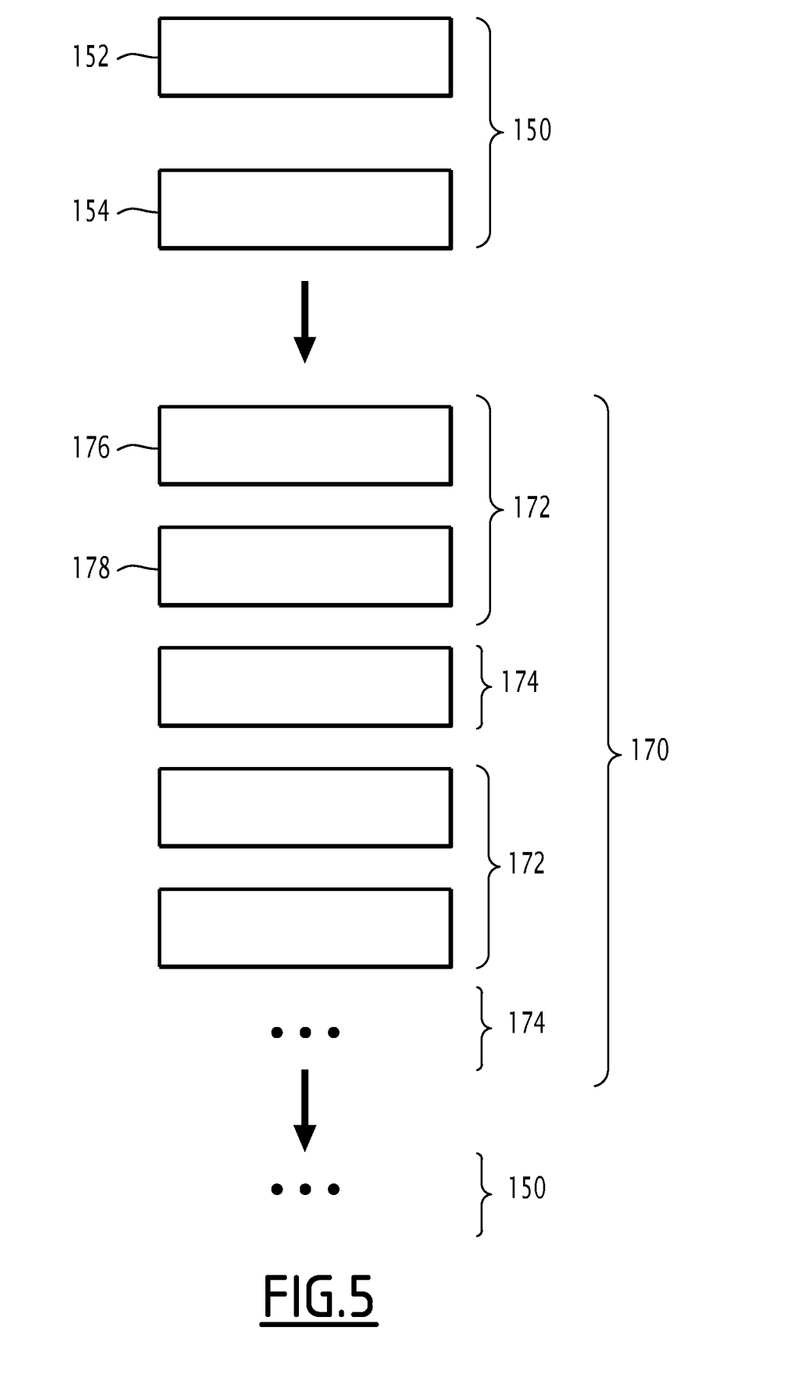
FIG. 5 is a flow chart similar to FIG. 4 for a variant of the laying and/or recovery method according to the invention.

The second method illustrated in FIG. 5 differs from the process illustrated in FIG. 4 in that it includes at least one phase 170 of immobilizing the line 12.

The immobilization phase 170 comprises a succession of intervals 172 for keeping the line 12 stationary, and load regulation intervals 174.

In each maintaining interval 172, the mechanical brakes 114 of all tensioners 72A, 72B are deactivated. The motors 110 of the upper tensioners 72A and the lower tensioners 72B remain active (step 176). They each apply a holding torque to the line 12, without moving the retaining members 90 (step 178). The line 12 is retained against its weight and is kept stationary relative to the tensioners 72A, 72B exclusively by the motors 110.

The control unit 19 regularly measures information representative of a difference between the load applied by the line 12 to at least one upper tensioner 72A and the load applied to the line 12 by at least one lower tensioner 72B using the sensors 76.

When the difference rises above a predetermined threshold, a regulation interval 174 is executed by the control unit 19.

In each regulation interval 174, a motor 110 of either an upper tensioner 72A or a lower tensioner 72B is activated to cause a movement member 90 of the upper tensioner 72A or the lower tensioner 72B to move. The motor 110 of the other of the upper tensioner 72A or the lower tensioner 72B remains active, but without its movement member 90 moving.

Preferably, the motor of at least one lower tensioner 72B is activated to cause the movement member 90 of the lower tensioner 72B to move. The motor 110 of each upper tensioner 72A remains active to apply to the movement member 90 of the upper tensioner 72A a torque to hold the line 12 against its weight, but without moving the movement member 90 of the upper tensioner 72A.

The movement of the lower tensioner 72A movement member by the motor 110 is then controlled as a function of the measured representative information so that the difference between the load applied by the line 12 onto at least one upper tensioner 72A and the load applied on the line 12 by at least one lower tensioner 72B, as measured with the sensors 76, falls below the predetermined threshold.

In one variant, in each regulation interval 174, a motor 110 of either an upper tensioner 72A or a lower tensioner 72B is activated to generate a change in the holding torque applied to a movement member 90 of the upper tensioner 72A or of the lower tensioner 72B, without moving the upper tensioner 72A or the lower tensioner 72B. The motor 110 of the other of the upper tensioner 72A or lower tensioner 72B remains active, but without changing the torque applied to its movement member 90 and without moving the upper tensioner 72A or the lower tensioner 72B.

Preferably, the motor of at least one lower tensioner 72B is activated to cause the torque applied to the movement member 90 of the lower tensioner 72B to change. The motor 110 of each upper tensioner 72A remains active to apply to the movement member 90 of the upper tensioner 72A the same torque to hold the line 12 against its weight, without moving the movement member 90 of the upper tensioner 72A.

The torque applied to the lower tensioner 72A movement member by the motor 110 is then controlled as a function of the measured representative information so that the difference between the load applied by the line 12 onto at least one upper tensioner 72A and the load applied on the line 12 by at least one lower tensioner 72B, as measured with the sensors 76, falls below the predetermined threshold.

Next, another maintaining interval 172 occurs.

Figure 6:
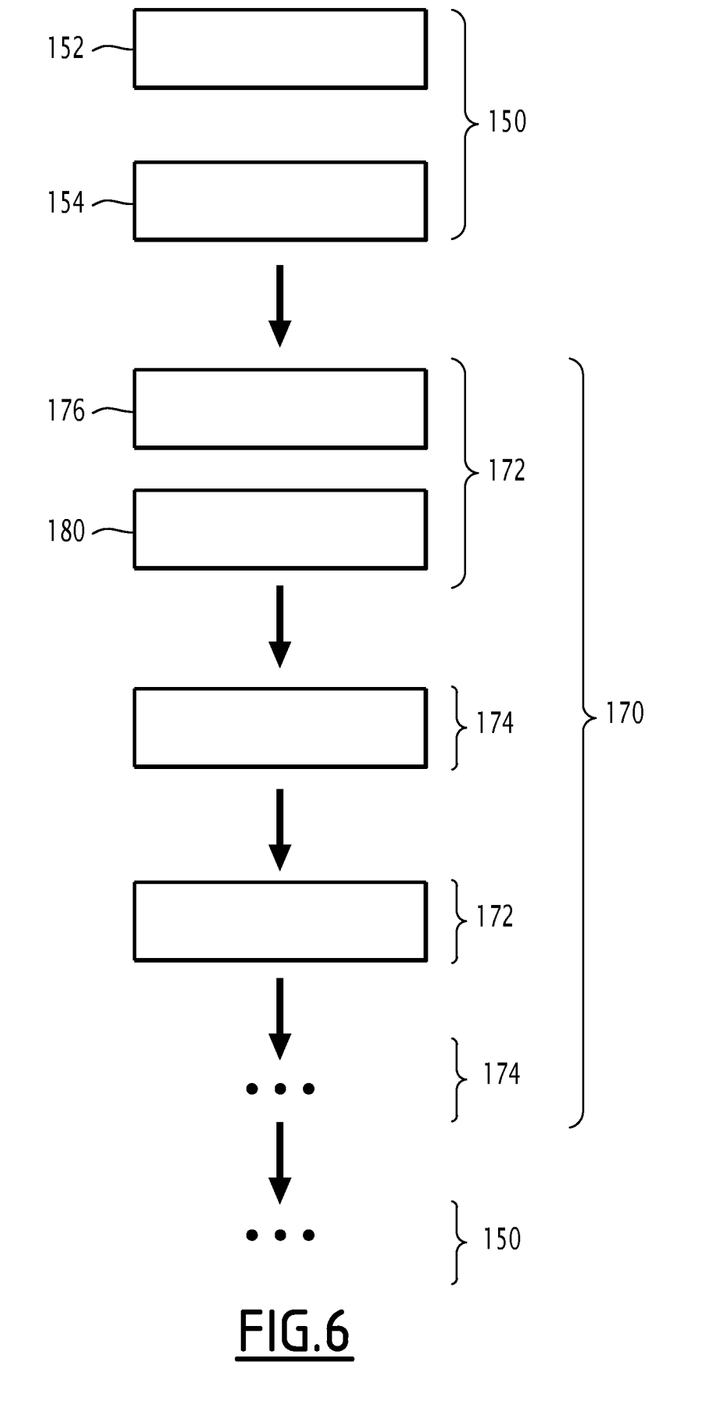
FIG. 6 is a flow chart similar to FIG. 4 for another variant of the laying and/or recovery method according to the invention.

The third method illustrated in FIG. 6 differs from the second method illustrated in FIG. 5 in that during the immobilization phase 170, a mechanical brake 114 is permanently applied to at least one upper tensioner 72A to immobilize the upper tensioner 72A (step 180).

During each regulation interval 174, the motor 110 of at least one lower tensioner 72B is activated to cause a movement member 90 of the lower tensioner 72B to move.

As before, the method comprises the measuring of information representative of a difference between the load applied by the line 12 to at least one upper tensioner 72A and the load applied to the line 12 by at least one lower tensioner 72B using the sensors 76.

When the difference rises above a predetermined threshold, a regulation interval is executed by the control unit 19.

The method then includes activating at least one lower tensioner 72B to cause the movement member 90 of the lower tensioner 72B to move. As before, the movement of the lower tensioner 72A movement member by the motor 110 is then controlled as a function of the measured representative information so that the difference between the load applied by the line 12 onto at least one upper tensioner 72A and the load applied on the line 12 by at least one lower tensioner 72B, as measured with the sensors 76, falls below the predetermined threshold.

The brake 114 of the upper tensioner 72A remains active during the regulation interval 174.

In one variant, during each regulation interval 174, the motor 110 of at least one lower tensioner 72B is activated to change the torque applied to a movement member 90 of the lower tensioner 72B, without moving the movement member 90 of the lower tensioner 72B.

As before, the method comprises the measuring of information representative of a difference between the load applied by the line 12 to at least one upper tensioner 72A and the load applied to the line 12 by at least one lower tensioner 72B using the sensors 76.

When the difference rises above a predetermined threshold, a regulation interval is executed by the control unit 19.

The method then comprises activating at least one motor 110 of a lower tensioner 72B to generate a change in the holding torque applied to the movement member 90 of the lower tensioner 72B. As before, the torque applied to the lower tensioner 72B movement member by the motor 110 is then controlled as a function of the measured representative information so that the difference between the load applied by the line 12 onto at least one upper tensioner 72A and the load applied on the line 12 by at least one lower tensioner 72B, as measured with the sensors 76, falls below the predetermined threshold.

The brake 114 of the upper tensioner 72A remains active during the regulation interval 174.

Alternatively, during the immobilization phase 174, a mechanical brake 114 is permanently applied to at least one lower tensioner 72B to immobilize the lower tensioner 72B. During each regulation interval 174, the motor 110 of at least one upper tensioner 72A is activated to cause a movement member 90 of the upper tensioner 72A to move or cause the torque applied to the movement member 90 of the upper tensioner 72A to change without moving the upper tensioner 72A.

Like the first method according to the invention, the second and third methods according to the invention allow the line 12 to be immobilized to carry out operations on it, without generating a substantial load difference applying between the tensioners.

This allows the tensioners 72A, 72B to be used to their full capacity, and thus to increase the mass of the laid lines 12, or on the contrary to not have to oversize the tensioners 72A, 72B.

The second and third methods according to the invention also lead to total immobilization of the line 12 allowing for totally safe servicing, limiting the risks to personnel working on the line.

The invention claimed is:

1. A method for laying and/or recovering a flexible line in a body of water, comprising:
   providing a laying device comprising a pair of upper tensioners and a pair of lower tensioners, the pair of upper tensioners and the pair of lower tensioners each defining a passage for circulation of the line in which the line is locally clamped, each tensioner of the pair of upper tensioners and of the pair of lower tensioners comprising a line mover and a motor for setting the line mover in motion, the motor being configured to deliver a line moving torque;
   a controller of the motor,
   the method comprising:
   at least one line laying and/or line recovery in which the controller activates the motor of at least one tensioner of the pair of upper tensioners and of the pair of lower tensioners and delivers a movement torque, said movement torque generating a continuous movement of the line through each circulation passage;
   at least one near-immobilization or immobilization of the line;
   the at least one near-immobilization or immobilization of the line comprising:
   the controller activating the motor of the upper tensioner and/or the lower tensioner, to apply, to the line mover of the upper tensioner and/or of the lower tensioner, a torque for holding the line against a weight of the line,
   the controller at least occasionally controlling at least one motor of an upper tensioner of the pair of upper tensioners and/or of a lower tensioner of the pair of lower tensioners:
   to cause the line mover of the upper tensioner and/or the lower tensioner to move, or
   to change the holding torque applied to the line mover of the upper tensioner and/or of the lower tensioner without moving the line mover of the upper tensioner and/or lower tensioner.

2. The method according to claim 1, comprising a near-immobilization of the line, in which the controller simultaneously controls at least one motor of an upper tensioner of the pair of upper tensioners and at least one motor of a lower tensioner of the pair of lower tensioners to generate a continuous movement of the line mover of the upper tensioner and/or of the lower tensioner, causing a continuous movement of the line through each circulation passage at a speed of less than 1 m/hour.

3. The method according to claim 2, wherein during the line laying and/or line recovery, the continuous movement of the line is greater than 1.5 m/hour.

4. The method according to claim 2, wherein the simultaneous control of at least one motor of the upper tensioner and at least one motor of the lower tensioner to generate a continuous movement of the line mover comprises measuring information representative of a load difference between a load applied to at least one upper tensioner of the pair of upper tensioners and a load applied to at least one lower tensioner of the pair of lower tensioners and selectively controlling the motor of the at least one upper tensioner and the motor of the at least one lower tensioner as a function of the load difference.

5. The method according to claim 1, comprising immobilizing the line, immobilizing the line comprising a succession of holding intervals of holding the line immobile in which the motors of at least one upper tensioner of the pair of upper tensioners and of at least one lower tensioner of the pair of lower tensioners apply the holding torque to the line without moving the line movers of the at least one upper tensioner and/or of the at least one lower tensioner, and load regulation intervals in which a motor of an upper tensioner of the pair of upper tensioners or of a lower tensioner of the pair of lower tensioners is active to cause:
  the line mover of the lower tensioner and/or the upper tensioner to move or
  the holding torque applied to the line mover of the upper tensioner and/or the lower tensioner to change without movement of the line mover of the upper tensioner and/or lower tensioner.

6. The method according to claim 5, wherein during each load regulation interval, the motor of at least one lower tensioner of the pair of lower tensioners is activated to cause the line mover of the lower tensioner to move or the holding torque applied to the line mover of the lower tensioner to change without movement of the line mover, the motor of each upper tensioner being activated to apply to the line mover of the upper tensioner a holding torque to hold the line against the weight of the line without moving the line mover of the upper tensioner.

7. A flexible line laying and/or recovering system in a body of water, comprising:
  a laying device comprising a pair of upper tensioners and a pair of lower tensioners, the pair of upper tensioners and the pair of lower tensioners each defining a circulation passage of the line in which the line is locally clamped;
  each tensioner of the pair of upper tensioners and of the pair of lower tensioners comprising a line mover for moving the line and a motor for setting the line mover in motion, the motor configured to be activated to deliver a line moving torque;
  a controller of the motor, configured to carry out:
  at least one line laying and/or line recovery in which the controller activates the motor of at least one tensioner of the pair of upper tensioners and the pair of lower tensioners and delivers a movement torque, said movement torque generating a continuous movement of the line through each circulation passage;
  at least one near-immobilization or immobilization of the line;
  the at least one near-immobilization or immobilization of the line comprising:
  the controller activating the motor of at least one upper tensioner and/or at least one lower tensioner, to apply, to the line mover of the upper tensioner and/or of the lower tensioner, a torque for holding the line against a weight of the line,
  the controller at least occasionally controlling at least one motor of an upper tensioner of the pair of upper tensioners and/or of a lower tensioner of the pair of lower tensioners:
  to cause a line mover of the upper tensioner and/or the lower tensioner to move, or
  to change the holding torque applied to the line mover of the upper tensioner and/or of the lower tensioner without moving the line mover of the upper tensioner and/or lower tensioner.

8. The system according to claim 7, wherein the controller is configured to carry out a near-immobilization of the line in which the controller simultaneously controls at least one motor of an upper tensioner of the pair of upper tensioners and at least one motor of a lower tensioner of the pair of lower tensioners to generate a continuous movement of the line mover, causing a continuous movement of the line through each circulation passage at a speed of less than 1 m/hour.

9. The system according to claim 7, wherein the controller is configured to carry out at least one immobilizing of the line, the immobilizing of the line comprising a succession of intervals of keeping the line immobile in which the at least one motor of the upper tensioner and of the lower tensioner apply the holding torque to the line without moving a line mover, and load regulation intervals in which a motor of the upper tensioner or of the lower tensioner is active in order to cause the line mover of the lower tensioner and/or the upper tensioner to move or to cause the holding torque applied to the line mover of the upper tensioner and/or the lower tensioner to change without movement of the line mover of the upper tensioner and/or lower tensioner.

10. The system according to claim 9, wherein during each regulation interval, the controller is configured to activate the motor of the at least one lower tensioner to cause the line mover of the lower tensioner to move or the holding torque applied to the line mover of the lower tensioner to change without movement of the lower tensioner, the motor of the upper tensioner being activated to apply to the line mover of the upper tensioner a holding torque to hold the line against a weight of the line without moving the line mover of the upper tensioner.

11. The system according to claim 9, in which the laying device comprises at least one mechanical brake configured to mechanically immobilize the motor of the upper tensioner, the at least one mechanical brake being activated by the controller, the controller being configured, during the immobilization to permanently apply the at least one mechanical brake to the upper tensioner in order to immobilize the upper tensioner, and during each regulation interval, to activate the motor of the lower tensioner to cause a line mover of the lower tensioner to move or cause the holding torque applied to the line mover of the lower tensioner to change without moving the line mover;
  or wherein the laying device comprises at least one mechanical brake configured to mechanically immobilize the motor of the lower tensioner, the at least one mechanical brake being activated by the controller, the controller being configured, during each immobilization, to permanently apply the at least one mechanical brake to at least one lower tensioner in order to immobilize the lower tensioner, and during each regulation interval, to activate the motor of the upper tensioner to cause a line mover of the upper tensioner to move or cause the holding torque applied to the line mover of the upper tensioner to change without moving the line mover of the upper tensioner.

12. The system according to claim 7, comprising at least one sensor configured to measure information representative of a load difference between a load applied to at least one upper tensioner of the pair of upper tensioners and a load applied to at least one lower tensioner of the pair of lower tensioners, the controller being configured to control the motor for moving the line mover of the lower tensioner and/or upper tensioner during each regulation interval as a function of the information.

13. A method for laying and/or recovering a flexible line in a body of water, comprising:
  providing a laying device comprising a pair of upper tensioners and a pair of lower tensioners, the pair of upper tensioners and the pair of lower tensioners each defining a passage for circulation of the line in which the line is locally clamped, each tensioner of the pair of upper tensioners and of the pair of lower tensioners comprising a line mover and a motor for setting the line mover in motion, the motor being configured to deliver a line moving torque;
a controller of the motor,
the method comprising:
at least one line laying and/or line recovery in which the controller activates the motor of at least one tensioner of the pair of upper tensioners and of the pair of lower tensioners and delivers a movement torque, said movement torque generating a continuous movement of the line through each circulation passage;
at least one near-immobilization or immobilization of the line;
the at least one near-immobilization or immobilization of the line comprising:
the controller activating the motor of the upper tensioner and/or the lower tensioner, to apply, to the line mover of the upper tensioner and/or of the lower tensioner, a torque for holding the line against a weight of the line,
the controller at least occasionally controlling at least one motor of an upper tensioner of the pair of upper tensioners and/or of a lower tensioner of the pair of lower tensioners:
to cause the line mover of the upper tensioner and/or the lower tensioner to move, or
to change the holding torque applied to the line mover of the upper tensioner and/or of the lower tensioner without moving the line mover of the upper tensioner and/or lower tensioner; and
immobilizing the line, immobilizing the line comprising a succession of holding intervals of holding the line immobile in which the motors of at least one upper tensioner of the pair of upper tensioners and of at least one lower tensioner of the pair of lower tensioners apply the holding torque to the line without moving the line movers of the at least one upper tensioner and/or of the at least one lower tensioner, and load regulation intervals in which a motor of an upper tensioner of the pair of upper tensioners or of a lower tensioner of the pair of lower tensioners is active to cause:
the line mover of the lower tensioner and/or the upper tensioner to move or
the holding torque applied to the line mover of the upper tensioner and/or the lower tensioner to change without movement of the line mover of the upper tensioner and/or lower tensioner, wherein during the immobilizing, a mechanical brake is permanently applied to at least one upper tensioner of the pair of upper tensioners to immobilize the upper tensioner, and wherein during each regulation interval, the motor of the at least one lower tensioner is activated to cause the line mover of the lower tensioner to move or cause the torque applied to the line mover of the lower tensioner to change without moving the line mover of the lower tensioner,
or wherein, during the immobilizing, a mechanical brake is permanently applied to at least one lower tensioner of the pair of lower tensioners to immobilize the lower tensioner, and wherein during each regulation interval, the motor of the at least one upper tensioner of the pair of upper tensioners is activated to cause the line mover of the upper tensioner to move or cause the torque applied to the line mover of the upper tensioner to change without moving the line mover of the upper tensioner.

14. A method for laying and/or recovering a flexible line in a body of water, comprising:
providing a laying device comprising a pair of upper tensioners and a pair of lower tensioners, the pair of upper tensioners and the pair of lower tensioners each defining a passage for circulation of the line in which the line is locally clamped, each tensioner of the pair of upper tensioners and of the pair of lower tensioners comprising a line mover and a motor for setting the line mover in motion, the motor being configured to deliver a line moving torque;
a controller of the motor,
the method comprising:
at least one line laying and/or line recovery in which the controller activates the motor of at least one tensioner of the pair of upper tensioners and of the pair of lower tensioners and delivers a movement torque, said movement torque generating a continuous movement of the line through each circulation passage;
at least one near-immobilization or immobilization of the line;
the at least one near-immobilization or immobilization of the line comprising:
the controller activating the motor of the upper tensioner and/or the lower tensioner, to apply, to the line mover of the upper tensioner and/or of the lower tensioner, a torque for holding the line against a weight of the line,
the controller at least occasionally controlling at least one motor of an upper tensioner of the pair of upper tensioners and/or of a lower tensioner of the pair of lower tensioners:
to cause the line mover of the upper tensioner and/or the lower tensioner to move, or
to change the holding torque applied to the line mover of the upper tensioner and/or of the lower tensioner without moving the line mover of the upper tensioner and/or lower tensioner;
immobilizing the line, immobilizing the line comprising a succession of holding intervals of holding the line immobile in which the motors of at least one upper tensioner of the pair of upper tensioners and of at least one lower tensioner of the pair of lower tensioners apply the holding torque to the line without moving the line movers of the at least one upper tensioner and/or of the at least one lower tensioner, and load regulation intervals in which a motor of an upper tensioner of the pair of upper tensioners or of a lower tensioner of the pair of lower tensioners is active to cause:
the line mover of the lower tensioner and/or the upper tensioner to move or
the holding torque applied to the line mover of the upper tensioner and/or the lower tensioner to change without movement of the line mover of the upper tensioner and/or lower tensioner; and
measuring information representative of a difference in load between a load applied to at least one upper tensioner of the pair of upper tensioners and a load applied to at least one lower tensioner of the pair of lower tensioners, a movement of the line mover of the lower tensioner and/or upper tensioner by the motor during each control interval, or the torque applied to the line mover of the lower tensioner and/or the upper tensioner by the motor during each regulation interval being controlled as a function of the information.

15. The method according to claim 14, wherein the movement of the line mover of the lower tensioner and/or the upper tensioner by the motor during each regulation interval or the change of the holding torque applied to the line mover of the upper tensioner and/or the lower tensioner is carried out when the difference in load exceeds a first predefined threshold and is stopped when the difference in load falls below a second predefined threshold.

\* \* \* \* \*